(12) United States Patent
De Peuter et al.

(10) Patent No.: US 12,400,469 B1
(45) Date of Patent: Aug. 26, 2025

(54) COMPUTATIONALLY EFFICIENT ARTIFACT TAGGING FOR DOCUMENT MANAGEMENT

(71) Applicant: Intuit Inc., Mountain View, CA (US)

(72) Inventors: Conrad Larson De Peuter, Mountain View, CA (US); Harsha Ilapakurty, New York, NY (US); Jadiel De Armas, Mountain View, CA (US); Tharathorn Rimchala, San Francisco, CA (US); Seth Harris Rubin, Toronto (CA); Subathra Sundararajan, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/899,977

(22) Filed: Sep. 27, 2024

(51) Int. Cl.
G06F 16/93 (2019.01)
G06F 16/16 (2019.01)
G06T 3/4038 (2024.01)
G06V 30/414 (2022.01)

(52) U.S. Cl.
CPC .......... *G06V 30/414* (2022.01); *G06F 16/164* (2019.01); *G06F 16/93* (2019.01); *G06T 3/4038* (2013.01)

(58) Field of Classification Search
CPC .............. G06F 16/24535; G06F 9/546; G06F 11/3409; G06F 16/2386; G06F 16/164; G06F 16/93; G06V 30/414; G06T 3/4038
USPC ........................................................ 707/825
See application file for complete search history.

(56) References Cited

U.S. PATENT DOCUMENTS

| | | | | |
|---|---|---|---|---|
| 6,400,996 | B1* | 6/2002 | Hoffberg | G06F 3/0481 700/86 |
| 11,809,822 | B2* | 11/2023 | Lin | G06F 40/216 |
| 2003/0074368 | A1* | 4/2003 | Schuetze | G06F 16/355 707/E17.022 |
| 2009/0015713 | A1* | 1/2009 | Horton | G06T 3/4015 382/104 |
| 2021/0271707 | A1* | 9/2021 | Lin | G06F 40/216 |

\* cited by examiner

*Primary Examiner* — Kuen S Lu
(74) *Attorney, Agent, or Firm* — Lathrop GPM LLP

(57) ABSTRACT

Image pages are generated from a document. Assembling the image pages generates a collage. Two-dimensional text and bounding boxes are extracted from the image pages. A structure verbalizer spatially formats the two-dimensional text in one-dimension with spatial information to generate spatial-formatted text. The spatial-formatted text is concatenated to generate a text extraction. A multimodal embedding model is applied to the collage and the text extraction to generate a target artifact vector. The target artifact vector is compared against a set of preexisting artifact vectors to identify a corresponding artifact vector associated with a corresponding document having a corresponding metadata tag. A distance is determined between the corresponding artifact vector and the target artifact vector. Responsive to the distance being within a threshold distance additional steps are performed, including performing both applying the corresponding metadata tag to the document to generate a modified document and outputting the modified document.

20 Claims, 8 Drawing Sheets

COMPUTATIONALLY EFFICIENT ARTIFACT TAGGING FOR DOCUMENT MANAGEMENT

BACKGROUND

Document management systems handle a large number of electronic documents as a knowledge base. The electronic documents may be tagged with metadata information in order to aid in searching the corpus of the knowledgebase.

The knowledge base may be refreshed several times each year to stay current with the latest electronic documents. Thus, electronic documents in the knowledge base may be added or revised on a regular basis.

Added or revised electronic documents desirably may be provided with metadata tags. The metadata tags may be used for downstream change analysis (for example, the metadata tags may be used by software(s) that access the knowledge base).

However, automatically adding such metadata tags to new or revised electronic documents may be labor intensive and inconsistent. For example, automated mechanisms for generating the metadata tags may be unavailable or impossible to generate due to the nature of the electronic documents in the knowledge base. Additionally, such automated mechanisms, if available, are computationally expensive. Thus, the total number of revised or new electronic documents may be excessive from the standpoint of available computational resources. As a result, generating the metadata tags for the entire knowledgebase, or even checking only the new and revised electronic documents, may be beyond available computational resources.

Thus, a technical problem is presented in view of the above. The technical problem is how to improve a computing system to generate metadata tags for electronic documents in a knowledge base in a manner that is sufficiently efficient to remain within available computational resources.

SUMMARY

One or more embodiments provide for a method. The method includes generating image pages from a target document. The method also includes generating an image collage by assembling the image pages into a sequential image mosaic including pixels. The method also includes extracting two-dimensional text and corresponding bounding boxes from the image pages. The method also includes applying a structure verbalizer to spatially format the two-dimensional text in one-dimension with spatial information based on the corresponding bounding boxes to generate spatial-formatted text. The method also includes concatenating the spatial-formatted text to generate a sequential spatial-formatted text extraction. The method also includes applying a multimodal embedding model to the pixels of the image collage and the sequential spatial-formatted text extraction to generate a target artifact vector. The target artifact vector including an embedded representation of the pixels and the sequential spatial-formatted text extraction. The method also includes comparing, using a nearest-neighbor model, the target artifact vector against each preexisting artifact vector in a set of preexisting artifact vectors to identify a corresponding artifact vector from the set of preexisting artifact vectors. The corresponding artifact vector is associated with a corresponding document. The corresponding document having a corresponding metadata tag. Responsive to a multimodal embedding distance between the corresponding artifact vector and the target artifact vector being within a threshold distance, the method also includes 1) applying the corresponding metadata tag to the target document to generate a modified target document, and 2) outputting the modified target document.

One or more embodiments provide for a system. The system includes a server including a processor and a data repository in communication with the processor, and storing a target document. The target document includes two-dimensional text. The data repository also stores an image collage that includes a sequential image mosaic having pixels. The data repository also stores spatial-formatted text that includes the two-dimensional text spatially formatted in one-dimension. The data repository also stores a sequential spatial-formatted text extraction. The data repository also stores a target artifact vector that includes an embedded representation of the pixels and the sequential spatial-formatted text extraction. The data repository also stores a set of preexisting artifact vectors. Each of set of preexisting artifact vectors has an embedded representation, and is associated with a corresponding document. The data repository also stores a threshold distance. The data repository also stores a modified target document. The processor is programmed to apply a structure verbalizer to spatially format the two-dimensional text in one-dimension with spatial information based on corresponding bounding boxes from image pages to generate the spatial-formatted text. The processor is also programmed to apply a multimodal embedding model to the pixels of the image collage and the sequential spatial-formatted text extraction to generate the target artifact vector. The system also includes a server controller executable by the processor to perform a computer implemented method including generating the image pages from the target document. The computer-implemented method also includes generating the image collage by assembling the image pages into the sequential image mosaic. The computer-implemented method also includes extracting the two-dimensional text and corresponding bounding boxes from the image pages. The computer-implemented method also includes applying the structure verbalizer to the two-dimensional text to generate the spatial-formatted text. The computer-implemented method also includes concatenating the spatial-formatted text to generate the sequential spatial-formatted text extraction. The computer-implemented method also includes applying the multimodal embedding model to the pixels of the image collage and the sequential spatial-formatted text extraction to generate the target artifact vector. The computer-implemented method also includes comparing, using a nearest-neighbor model, the target artifact vector against each preexisting artifact vector in the set of preexisting artifact vectors to identify a corresponding artifact vector from the set of preexisting artifact vectors. The corresponding artifact vector has a similar embedded representation that is similar to the embedded representation of the pixels and the sequential spatial-formatted text extraction. The corresponding document associated with the corresponding artifact vector has a corresponding metadata tag. The computer-implemented method also includes determining that a multimodal embedding distance between the corresponding artifact vector and the target artifact vector are within the threshold distance. In response to determining the method also includes adding the corresponding metadata tag to the target document to generate the modified target document and outputting the modified target document.

One or more embodiments provide for another method. The method includes generating image pages from a target document. The method also includes generating an image collage by assembling the image pages into a sequential image mosaic having pixels. The method also includes extracting two-dimensional text and corresponding bounding boxes from the image pages. The method also includes applying a structure verbalizer to spatially format the two-dimensional text in one-dimension with spatial information based on the corresponding bounding boxes to generate spatial-formatted text. The method also includes concatenating the spatial-formatted text to generate a sequential spatial-formatted text extraction. The method also includes applying a multimodal embedding model to the pixels of the image collage and the sequential spatial-formatted text extraction to generate a target artifact vector having an embedded representation of the pixels and the sequential spatial-formatted text extraction. The method also includes comparing using a nearest-neighbor model to the target artifact vector against each preexisting artifact vector in a set of preexisting artifact vectors to identify a corresponding artifact vector from the set of preexisting artifact vectors. The corresponding artifact vector has a similar embedded representation that is similar to the embedded representation of the pixels and the sequential spatial-formatted text extraction. The corresponding artifact vector is associated with a corresponding document, the corresponding document having a corresponding metadata tag. Responsive to a multimodal embedding distance between the corresponding artifact vector and the target artifact vector not being within a threshold distance, the method also includes performing additional steps including flagging the target document as an anomalous document. The additional steps also include applying a large language model to the target document to generate a created metadata tag. The additional steps also include adding the created metadata tag to the target document to generate a modified target document. The additional steps also include outputting the modified target document.

Other aspects of one or more embodiments will be apparent from the following description and the appended claims.

BRIEF DESCRIPTION OF DRAWINGS

Like elements in the various figures are denoted by like reference numerals for consistency.

DETAILED DESCRIPTION

One or more embodiments are directed to a technical solution to the above-identified technical problem. Briefly, again, the technical problem is how to improve a computing system to generate metadata tags for electronic documents in a knowledge base in a manner that is sufficiently efficient to remain within available computational resources. The technical solution is described with respect to the following figures, but is summarized as follows.

The technical solution involves processing an artifact, such as a revised or new document to be added to a knowledge base, to generate a target artifact vector. The target artifact vector is compared to preexisting artifact vectors, corresponding to existing documents in the knowledgebase, in order to locate a sufficiently similar document (such as a prior version of the target document). The metadata tags from the similar document are used to tag the target document. The resulting, tagged target document and the target artifact vector may be added to the knowledgebase.

In an embodiment, if no sufficiently similar document is located, the target document is determined to be anomalous. Anomalous documents may be flagged for additional treatment.

In an embodiment, automatic artifact tagging uses a hybrid machine learning (ML) approach. Using historical data, existing artifacts provide information for metadata tags which are to be added to the new artifact. The ML process identifies a similar artifact to the target artifact to be added.

One or more embodiments take advantage of the prevalence of updates to existing documents in many knowledge bases (e.g., current year artifacts have prior year counterparts containing similar textual content). In contrast, few artifacts are completely new (having no prior year counterparts). Using a nearest neighbor approach, one or more embodiments locate prior year artifacts and propagate metadata tags to new or revised artifacts accordingly. Artifacts with no prior year counterparts are flagged as anomalies.

Once the process is complete, the knowledge base is considered revised. Revised artifacts within the revised knowledge base are then available for further downstream services. The downstream services may be one or more software applications that, when executed by a processor, uses the artifacts as input.

Figure 1A:
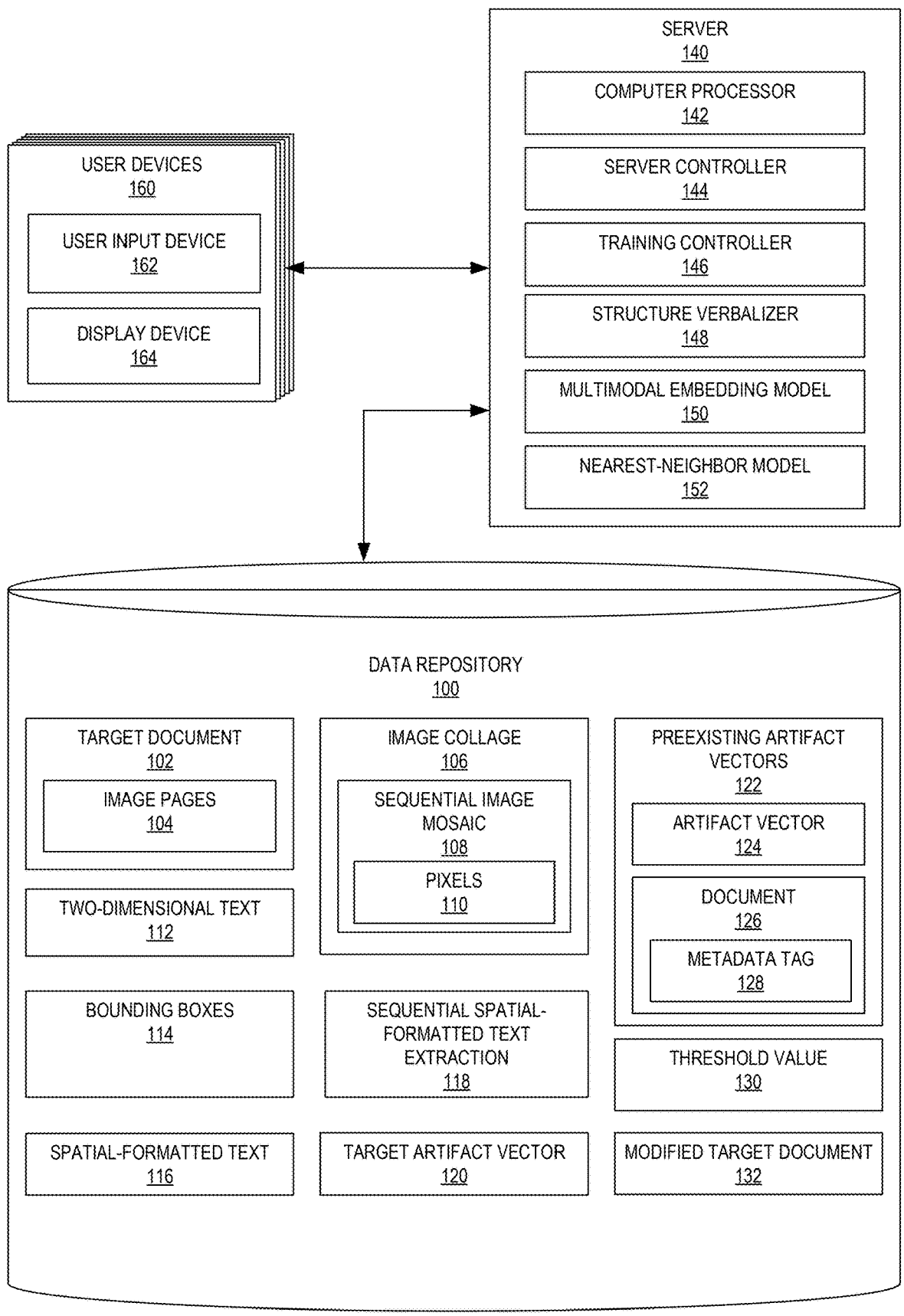
FIG. 1A and FIG. 1B show a computing system, in accordance with one or more embodiments.

Attention is now turned to the figures. FIG. 1A shows a computing system, in accordance with one or more embodiments. The system shown in FIG. 1A includes a data repository (100). The data repository (100) is a type of storage unit or device (e.g., a file system, database, data structure, or any other storage mechanism) for storing data. The data repository (100) may include multiple different, potentially heterogeneous, storage units and/or devices.

The data repository (100) stores a target document (102). The target document (102) is a computer file or other data structure that contains information. The information may be stored as data representing pixels that, when considered together, form one or more image pages (104). Each image page of the image pages (104) may be a page from the target document (102) or a portion of a page. The page may include text, images, tables, and possibly other information.

The data repository (100) also stores an image collage (106). The image collage is an assemblage of the image pages (104). The assemblage of the image pages (104) may be in a sequential image mosaic (108). The sequential image mosaic (108) includes pixels (110) which make up images from the image pages. The term "sequential" means that the image pages (104) are arranged in a pre-determined sequence. Thus, the pixels (110) also have a pre-determined sequence relative to each other.

The data repository (100) also stores two-dimensional text (112). The two-dimensional text (112) is alphanumeric text or special characters organized in two dimensions, for example, text on a page organized according to the placement of the text in the original document. The two-dimensional text (112) may be the text of the target document (102).

The data repository (100) also stores bounding boxes (114). The bounding boxes (114) are data that represents the layout information of the target document (102). The bounding boxes (114) may include hierarchical details regarding the size, placement, and orientation of elements on a document page. The bounding boxes (114) also may be pixels that, when rendered in one or more of the image pages (104), are displayed as lines, highlighting, or other structures that represent borders around text or other aspects of the image pages (104).

For example, the size and orientation of the page may be described in a page-level bounding box. In another example, the size and placement of an image on the page may be described in a bounding box associated with the page-level bounding box. In another example, the location and size of text columns on the page may be described in other bounding boxes associated with the page-level bounding box. In another example, an image of a box, circle, or other image may be described in a bounding box associated with the page-level bounding box.

The data repository (100) also stores spatial-formatted text (116). The spatial-formatted text (116) may include the two-dimensional text (112) and formatting information representing how the two-dimensional text (112) is located on the page (as a one-dimensional sequence). Thus, the spatial-formatted text (116) may be a mapping of the two-dimensional text (112) and spatial information based on a corresponding bounding boxes (114). The spatial-formatted text (116) may be generated by a structure verbalizer, as described with respect to FIG. 2.

The data repository (100) also stores a sequential spatial-formatted text extraction (118). The sequential spatial-formatted text extraction (118) is a string of the alphanumeric text or special characters of the spatial-formatted text (116) combined with spatial-formatted information, for example, page break characters. The sequential spatial-formatted text extraction (118) may be generated by a concatenation of the spatial-formatted text (116), as described with respect to FIG. 2.

The data repository (100) also stores a target artifact vector (120). The target artifact vector (120) represents the target document (102) in a low-dimensional space. The target artifact vector (120) may be a mapping of the target document (102) to the low-dimensional space. The low-dimensional space is a form of data that a processor may process (e.g., data expressed in binary format). The target artifact vector (120) may be generated by a multimodal embedding model, as described with respect to FIG. 2.

The data repository (100) also stores preexisting artifact vectors (122). The preexisting artifact vectors (122) are one or more artifact vectors (124) corresponding to a document (126). However, the one or more artifact vectors (124) are "preexisting" if either the artifact vector or the corresponding document (126) already existed in a knowledge base. The artifact vector (124) represents the document (126) in the low-dimensional space, or a part of the document in the low-dimensional space. The artifact vector (124) may be mappings of the document (126), or parts of the document (126), to the low-dimensional space. A multimodal embedding model may generate the preexisting artifact vectors (122).

The data repository (100) also stores one or more metadata tags (128) associated with a document (126). The metadata tag (128) is data associated with the document (126), but not part of the document (126) itself. The metadata tag (128) may include information regarding the document, such as the document data structure type, associated applications that consume the document, document name, document form type, document publisher, document assigned status, document timestamps, document version, etc. The metadata tag (128) may be generated as described with respect to FIG. 2.

The data repository (100) also stores a threshold value (130). The threshold value (130) is a boundary or limit value which may be compared to a distance value determined for the artifact vector (124) relative to the target artifact vector (120). The distance value is a measure of similarity as determined by a nearest neighbor method between the artifact vector (124) and the target artifact vector (120). Use of the threshold value (130) is described with respect to FIG. 2.

The data repository (100) also stores a modified target document (132). The modified target document (132) is the target document (102) combined with one or more metadata tags, such as the metadata tag (128) described above.

The system shown in FIG. 1A may include other components. For example, the system shown in FIG. 1A also may include a server (140). The server (140) is one or more computer processors, data repositories, communication devices, and supporting hardware and software. The server (140) may be in a distributed computing environment. The server (140) is configured to execute one or more applications, such as the training controller (146), the structure verbalizer (148), the multimodal embedding model (150), and the nearest-neighbor model (152). An example of a computer system and network that may form the server (140) is described with respect to FIG. 5A and FIG. 5B.

The server (140) includes a computer processor (142). The computer processor (142) is one or more hardware or virtual processors which may execute computer readable program code that defines one or more applications, such as the training controller (146), the structure verbalizer (148), the multimodal embedding model (150), and the nearest-neighbor model (152). An example of the computer processor (142) is described with respect to the computer processor(s) (502) of FIG. 5A.

The server (140) also may include a server controller (144). The server controller (144) is software or hardware programmed to coordinate execution of one or more of the training controller (146), the structure verbalizer (148), the multimodal embedding model (150), and the nearest-neighbor model (152). The server controller (144) also may be software or hardware programmed to cause the computer processor (142) to execute one or more steps of the method of FIG. 2.

The server (140) also includes a structure verbalizer (148). The structure verbalizer (148) is software or hardware that generates spatial-formatted text in one-dimension (i.e., the sequential spatial-formatted text extraction (118)). The structure verbalizer (148) may take as input two-dimensional text (112) and corresponding bounding boxes (114). Use of the structure verbalizer (148) is described with respect to FIG. 2.

The server (140) also includes the multimodal embedding model (150). The multimodal embedding model (150) is a machine learning model that encodes image pixels (i.e., the pixels (110)) and a sequential spatial-formatted text extraction (118) into a vector containing low-dimensional data directly readable by the computer processor (142). The multimodal embedding model (150) may be a multimodal machine learning model, in some embodiments (e.g., CLIP® by Open AI OpCo, LLC). However, the multimodal embedding model (150) may be other types of large multimodal models, such as GEMINI® by GOOGLE®, deep learning machine learning models, or others. Use of the multimodal embedding model (150) is described with respect to FIG. 2.

The server (140) also includes a nearest-neighbor model (152). The nearest-neighbor model (152) is software or hardware that compute pairwise distances between a query vector (such as the target artifact vector (120)) and a collection of corpus vectors (such as a set preexisting artifact vectors (122)). The nearest-neighbor model (152) may return a ranked list of top closest k vectors in the corpus to the query vector. Use of the nearest-neighbor model (152) is described with respect to FIG. 2.

FIG. 1 also shows one or more user devices (160). The user devices (160) are the computing systems which users may use to submit the target document (102). The user devices (160) may include a mouse, keyboard, microphone, touch screen, haptic device, etc., with which the user may interact. Thus, the user devices (160) are computing systems, which a user may use to interact with the server (140). For example, the target document (102) may be received from one or more of the user devices (160), as described in step 202 of FIG. 2.

In many cases, the user devices (160) are not part of a system owned or operated by the entity that owns or operates the server (140). Such user devices (160) may be referred to as "remote" devices and thus may not be part of the system of FIG. 1. However, one or more of the user devices (160) may be part of the same system of which the server (140) is a part. In this case, such user devices (160) may be referred to as "local" devices, even if the user devices (160) are not in the same physical geographical location. Local devices may be considered part of the system shown in FIG. 1. The user devices (160) may include a user input device (162) and a display device (164), as described in more detail with respect to FIG. 5A.

While FIG. 1 shows a configuration of components, other configurations may be used without departing from the scope of one or more embodiments. For example, various components may be combined to create a single component. As another example, the functionality performed by a single component may be performed by two or more components.

Figure 1B:
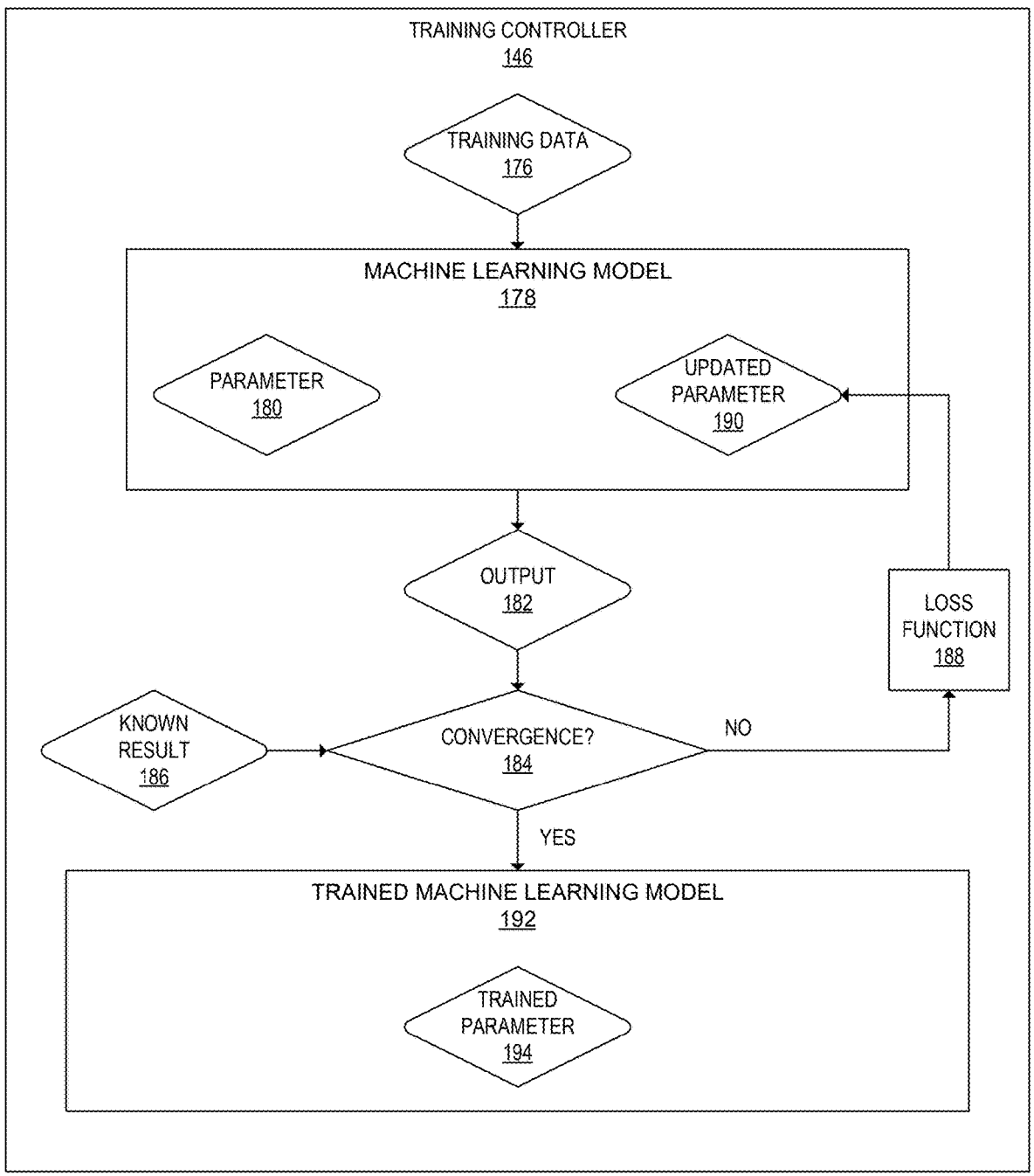

Attention is turned to FIG. 1B, which shows the details of the training controller (146). The training controller (146) is a training algorithm, implemented as software or application specific hardware, that may be used to train one or more of the machine learning models described, with respect to the computing system of FIG. 1A.

In general, machine learning models are trained prior to being deployed. The process of training a model, briefly, involves iteratively testing a model against test data for which the final result is known, comparing the test results against the known result, and using the comparison to adjust the model. The process is repeated until the results do not improve more than some pre-determined amount, or until some other termination condition occurs. After training, the final adjusted model is applied to unknown data (i.e., a query for which the actual resulting vector is not known) in order to make a vector.

Some machine learning models may be applied to vector data structures. A vector is a computer readable data structure. A vector may take the form of a matrix, an array, a graph, or some other data structure. However, a frequently used vector form is a one by N matrix, where each cell of the matrix represents the value for one feature. As described above, a feature is a topic of data (e.g., a color of an object, the presence of a word or alphanumeric text, a physical measurement type, etc.). A value is a numerical or other recorded specification of the feature. For example, if the feature is the word "cat," and the word "cat" is present in a corpus of text, then the value of the feature may be "1" (to indicate a presence of the feature in the corpus of text).

In one or more embodiments, some of the data in the data repository (100) of FIG. 1A may be stored in the form of one or more vectors. For example, target artifact vector (120) and the preexisting artifact vectors (122) may be expressed as vectors. Similarly, the target document (102) and document (126) may be converted from natural language into vectors as part of executing the multimodal embedding model (150).

Returning to the operation of the training controller (146), training starts with training data (176), which may be expressed in vector form. The training data (176) may include target documents and the document (126) from FIG. 1A, expressed in vector form.

The training data (176) may be labeled. The labels represent a known result. Thus, a label applied to a query may indicate the expected vector to be generated.

Thus, the training data (176) may be data for which the final result is known with certainty. For example, when the multimodal embedding model (150) is called during training to process a target document, the multimodal embedding model (150) generates the vector in a low-dimensional, embedded-vector space. However, the label on the target document is the expected vector—the resulting vector that is known to be correct. If the prediction does not match the label, then the weights of the layers may be updated and the training process iterated.

More generally, the training data (176) is provided as input to the machine learning model (178), which may be the multimodal embedding model (150) of FIG. 1A. The machine learning model (178) may be characterized as a program that has adjustable parameters. The program is capable of learning and recognizing patterns to make predictions. The output of the machine learning model (178) may be changed by changing one or more parameters of the algorithm, such as the parameter (180) of the machine learning model (178). The parameter (180) may be one or more weights, the application of a sigmoid function, a hyperparameter, or possibly many different variations that may be used to adjust the output of the function of the machine learning model (178).

One or more initial values are set for the parameter (180). The machine learning model (178) is then executed on the training data (176). The result is an output (182), which is a prediction, a classification, a value, or some other output which the machine learning model (178) has been programmed to output.

The output (182) provided goes through a convergence process (184). The convergence process (184) is programmed to achieve convergence during the training process. Convergence is a state of the training process, described below, in which a pre-determined end condition of training has been reached. The pre-determined end condition may vary based on the type of machine learning model (178) being used (supervised versus unsupervised machine learning), or may be pre-determined by a user (e.g., convergence occurs after a set number of training iterations, described below).

In the case of supervised machine learning (e.g., the multimodal embedding model (150) of FIG. 1A), the convergence process (184) compares the output (182) to a known result (186). The known result (186) is stored in the form of labels for the training data (176). For example, the known result (186) for a particular entry in an output (182)

vector of the machine learning model (178) may be a known value and that known value is a label that is associated with the training data (176).

Continuing the example of supervised machine learning model training, a determination is made whether the output (182) matches the known result (186) to a pre-determined degree. The pre-determined degree may be an exact match, a match to within a pre-specified percentage, or some other metric for evaluating how closely the output (182) matches the known result (186). Convergence may occur when the known result (186) matches the output (182) to within a pre-specified percentage. When many predictions are involved, then convergence may occur when more than a threshold number of predictions correctly match the corresponding labels.

For example, the threshold the number of weight update steps or number of training epochs in which the model stops improving. In this case, when the multimodal embedding model's (150) may plateau at or below a certain accuracy level for M iteration steps or N epochs then convergence occurs and training finishes.

In the case of unsupervised machine learning, the convergence process (184) may be compared to the output (182), or to a prior output in order to determine a degree to which the current output changed relative to the immediately prior output, or to the original output. Once the degree of change fails to satisfy the threshold degree of change, then the machine learning model may be considered to have achieved convergence. Alternatively, an unsupervised model may determine pseudo labels be applied to the training data and then achieve convergence as described above for a supervised machine learning model. Other machine learning training processes exist, but the result of the training process may be convergence.

If convergence has not occurred (a "no" at the convergence process (184)), then a loss function (188) is generated. The loss function (188) is a program which adjusts the parameter (180) (one or more weights, settings, etc.) in order to generate an updated parameter (190). The basis for performing the adjustment is defined by the program that makes up the loss function (188). The program may be an algorithm which attempts to adjust the parameters based on the errors made by the model with the current set of parameters (180) so that the next execution of the machine learning model (178), using the training data (176) with the updated parameter (190), will have an output (182) that is more likely to result in convergence. In this manner, the next execution of the machine learning model (178) is more likely to match the known result (186) (supervised learning), or which is more likely to result in an output (182) that more closely approximates the prior output (one unsupervised learning technique), or which otherwise is more likely to result in convergence.

In any case, the loss function (188) is used to specify the updated parameter (190). As indicated, the machine learning model (178) is executed again on the training data (176), this time with the updated parameter (190). The process of execution of the machine learning model (178), execution of the convergence process (184), and the execution of the loss function (188) continues to iterate until convergence.

Upon convergence (a "yes" result at the convergence process (184)), the machine learning model (178) is deemed to be a trained machine learning model (192). The trained machine learning model (192) has a final parameter, represented by the trained parameter (194). Again, the trained parameter (194) shown in FIG. 1B may be multiple parameters, weights, settings, etc.

During deployment, the trained machine learning model (192) with the trained parameter (194) is executed again, but this time on an unknown query (which may be in the form of an unknown data vector) for which the final result is not known. The output of the trained machine learning model (192) is then treated as the generated vector relative to the unknown query.

Figure 2:
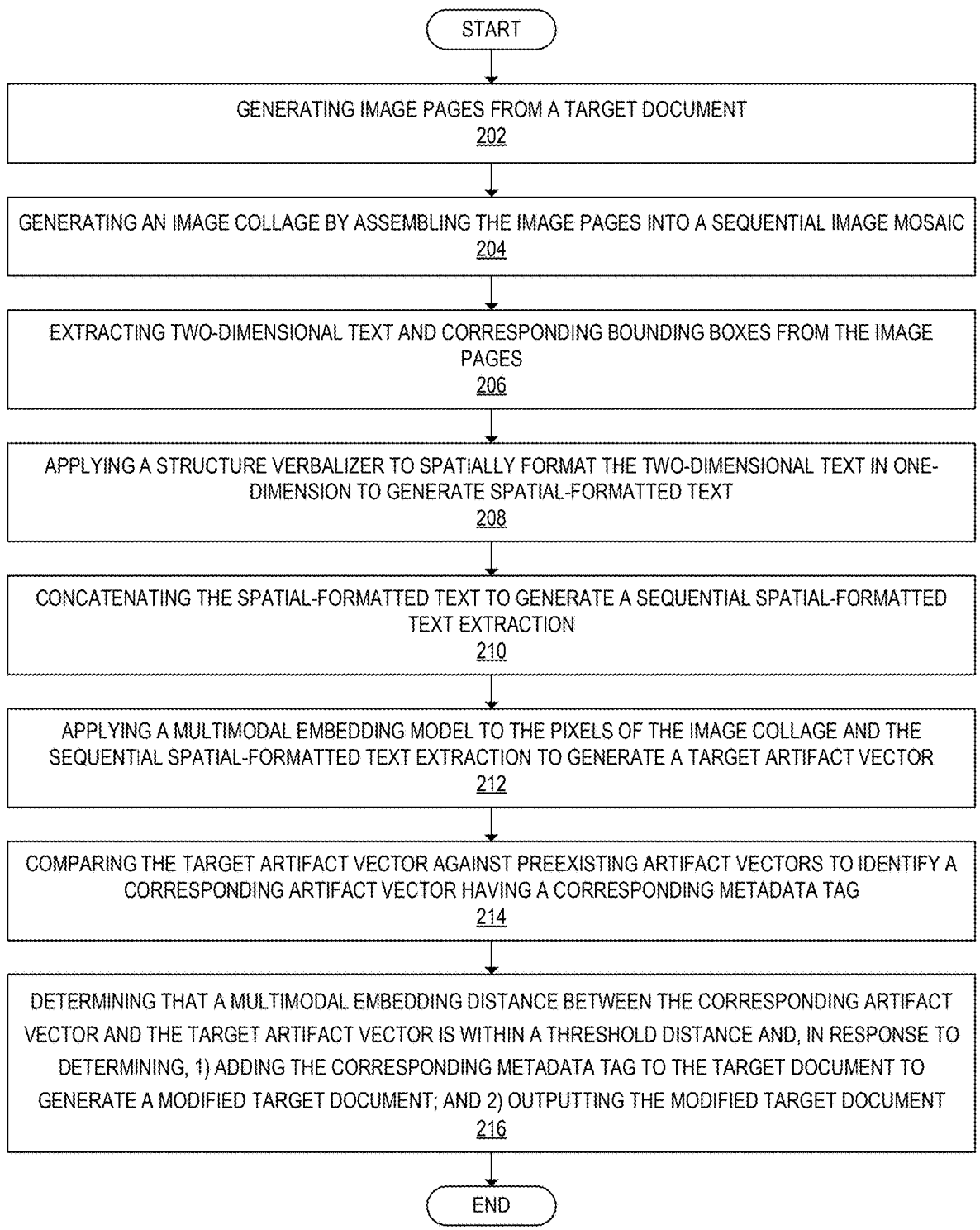
FIG. 2 shows a flowchart of a method for computationally efficient artifact tagging of a target document, in accordance with one or more embodiments.

FIG. 2 shows a flowchart of a method for AI accelerated artifact tagging of a target document, in accordance with one or more embodiments. The method of FIG. 2 may be implemented using the system of FIG. 1 and one or more of the steps may be performed on or received at one or more computer processors.

Step 202 includes generating image pages from a target document. Generating the image pages may be performed by various methods, depending on the original data structure in which the target document is stored. For example, if the target document is already an image, then generating image pages may be simply receiving the image page or pages of the target document. In an embodiment, generating the image pages may include separating the target document into individual pages, each page being an image page with text, pictures, and/or tables. In another example, if the target document is a text file, then an image converter application may be used to convert the text file into an image composed of pixels that represent the data contained in the text file (e.g., images of words, bounding boxes around text, etc.). In still another example, if the target document is stored as a low-level data structure (e.g., a vector), then an appropriate application (e.g., an embedding machine learning model) may be used to convert the low-level data structure into an image file composed of pixels that represent the data contained in the low-level data structure.

Note that the arrangement of pixels representing the target document need not form a human readable image. For example, the arrangement of pixels and the types of pixels (e.g., size, shape, color, etc.) may encode information contained in the target document.

In any case, the target document represents a document already contained in a knowledge base (e.g., a revised document) or a document to be added to a knowledge base. The target document may or may not have metadata tags. If established metadata tags are included, the established metadata tags may or may not conform to the metadata tags used by the knowledge base.

Step 204 includes generating an image collage by assembling the image pages of the target document into a sequential image mosaic. The image collage may be generated by separating individual image pages of the target document and then arranging the image pages in a logical and reproducible order that maps to an equivalent logical order of pages or information in the target document. The image collage also may be generated by breaking up a larger image into multiple smaller images, each of which is a portion of the larger image. The image collage also may be generated by directly converting the target document into the sequential image mosaic.

In any case, the image collage includes pixels arranged into the image pages. The image collage may be arranged in a grid of image pages.

In an example, the grid may be arranged in sequence from left-to-right, top-to-bottom, with the first page in the top-left corner, and the subsequent page to the right of the first page in a first row. In the first row, the last page (for example, the third page in a 3×3 grid) may be located in the top-right corner. The next page is located below the first page in the top-left corner. However, many different arrangements of image collages are possible. Regardless of the arrangement selected, the image pages are arranged in a logical order that maps to an equivalent logical order of pages or information in the target document.

Step 206 includes extracting two-dimensional text and corresponding bounding boxes from the image pages. The two-dimensional text may be determined by using optical character recognition (OCR) techniques. For example, a multimodal model may be used to recognize the text and bounding boxes, some other machine learning model may be used to recognize the text and bounding boxes (e.g., computer vision models, deep learning models, etc.), or a non-machine learning OCR application may recognize the text.

The bounding boxes represent the location of the text on the image page. The bounding box may indicate relative placement of the text, for example, left column and right column.

Note that one or more embodiments contemplate performing the OCR procedure on the images, even if the original target document was a text file. A reason for the additional procedure is that data defining the pixels that compose the text is processed differently by the structure verbalizer (described below) relative to a text processing application (e.g., a large language model, a word processor, etc.).

Step 208 includes applying a structure verbalizer to spatially format the two-dimensional text into one-dimension. The structure verbalizer is applied to the two-dimensional text and the corresponding bounding boxes to determine spatial information for spatial-formatted text.

The structure verbalizer operates by converting the two-dimensional text into a one-dimensional sequence. For example, the two-dimensional text represented by the bounding box coordinates of individual words in the document. The structure verbalizer first linearizes two-dimensional text into a sequence of lines. Then, the structure verbalizer finds a corresponding vertical alignment of individual words across lines and insert whitespace characters between words such that the linearized one-dimension text appears like the two-dimensional text when printed by standard word processing software. The end result of applying the structure verbalizer may be to generate a sequence of one-dimensional texts that captures the appearance of the texts in two dimensions.

Step 210 includes concatenating the spatial-formatted text to generate a sequential spatial-formatted text extraction. The sequential spatial-formatted text extraction may include information regarding key-value-sets present in the document. Additionally, the sequential spatial-formatted text extraction may include table bounds and table structures found in the target document.

Concatenating includes appending a one-dimensional data structure for one page in the image collage to another one-dimensional data structure for a subsequent page in the image collage. Thus, for example, the vector generated at Step 208 for a first image page in the image collage may be added to a second vector generated for a second image page in the image collage. Accordingly, the resulting vector may become longer in the example. A break or another feature may be added to the concatenated vector (i.e., the sequential spatial-formatted text extraction) to separate, or otherwise identify, data representing individual image pages in the image collage.

Step 212 includes applying a multimodal embedding model to the pixels of the image collage and the sequential spatial-formatted text extraction to generate a target artifact vector. The multimodal embedding model is programmed to transform the pixels and the sequential spatial-formatted text extraction into an embedded representation of the pixels and the sequential spatial-formatted text extraction. Thus, the output of the multimodal embedding model is a vector data structure storing the embedding that composes the target artifact vector.

Step 214 includes comparing, using a nearest-neighbor model, the target artifact vector against each preexisting artifact vector in a set of preexisting artifact vectors to identify a corresponding artifact vector from the set of preexisting artifact vectors. Comparing is performed, on a vector-by-vector basis, by inputting the target artifact vector and the preexisting artifact vector into the nearest-neighbor model. The artifact vectors for the preexisting artifacts are similarly constructed as the target artifact vector, so that the vectors are comparable.

The output of the model is a value that represents a similarity of the two vectors to each other according to a predetermined similarity scheme, such as a normalized Euclidean distance. For example, if the data contained in the two vectors are nearly equivalent, then the output of the model may be "0.99," representing a close match. However, if the data contained in the two vectors are nearly entirely different, then the output of the model may be "0.02," representing an indication that the two vectors are different.

The procedure is repeated for the target artifact vector and for each additional artifact vector having a corresponding metadata tag. Thus, a series of values are generated, each value representing the similarity of the target artifact vector and a corresponding one of the artifact vectors.

The generated similarity values may be compared to a threshold value. Preexisting artifact vectors having generated similarity values that fail to satisfy the threshold value are not considered for being the corresponding artifact vector for which the corresponding metadata tag may be copied to the target artifact vector, as described below with respect to step 216.

Thus, the threshold value limits the permitted similarity distance between the preexisting artifact vectors and the target artifact vector. The threshold value prevents dissimilar documents being used for inferring the metadata tags, as described below. However, for a sufficiently similar document (or the most similar document among multiple sufficiently similar documents) the metadata tags may be inferred from the metadata tags of the neighbors by voting.

Voting may mean selection of the corresponding artifact vector having the highest similarity score to the target artifact vector. However, voting may be performed by other techniques, such as for example a voting machine learning model that takes as input the target artifact vector and multiple available corresponding artifact vectors and, when executed, outputs a voted corresponding artifact vector that is most similar to the target artifact vector. In this case, if the voted corresponding artifact vector has a corresponding similarity value that satisfies the threshold value, then the voted corresponding artifact vector is selected and the corresponding metadata tag for the voted corresponding artifact vector is mapped to the target document corresponding to the target artifact vector.

Assuming at least some of the remaining values for the remaining artifact vectors satisfy the threshold, then the remaining values may be compared. The highest value may be selected. The artifact vector having the associated highest value is identified as the corresponding artifact vector that is to be used at Step 216, below. Alternatively, if only one of the remaining values exists after comparison to the threshold, then the lone corresponding artifact vector is selected as the corresponding artifact vector that is to be used at Step 216, below.

Stated differently, if the corresponding artifact vector has a sufficiently similar embedded representation relative to the embedded representation of the pixels and the sequential spatial-formatted text extraction, then the value for corresponding artifact vector satisfies the threshold value. In this case, the corresponding artifact vector is associated with a corresponding document. The corresponding document has a corresponding metadata tag, which is then mapped to the document corresponding to the target artifact vector at Step 216, below.

In some embodiments, the corresponding artifact vector is generated based on a subset of image pages from the source artifact (e.g., the target document, a preexisting document in the knowledge base, etc.). The subset may be, for example, the first ten pages of the target document.

If none of the values satisfy the threshold, then none of the corresponding artifact vectors are deemed close enough to be comparable to the target artifact vector. Accordingly, none of the preexisting metadata tags may be associated with the target document. In this case, the target document corresponding to the target artifact vector is identified as an anomaly, and the method of FIG. 2 terminates immediately (i.e., the method of FIG. 2 ends before proceeding to Step 216.) In an embodiment, the anomalous target artifact vector or the anomalous target document are provided to another application or to a human technician for metadata tag labeling.

Stated differently, target artifacts for which none of the nearest neighbors have a distance above the threshold (0.5) are deemed anomalous. The anomalous artifacts may be routed to an LLM-based information gathering process to generate tags based on the text of the target document. Since the metadata tags are inferred based on the input, the system can check for hallucinated tags by programmatically verifying whether the tags generated by the LLM are present in the LLM input (artifact content, possible options for each metadata tag, instruction, few shot demonstration, etc.)

Step 216 includes determining that a multimodal embedding distance between the corresponding artifact vector and the target artifact vector are within a threshold distance. In response to determining, the method also includes 1) adding the corresponding metadata tag to the target document to generate a modified target document and 2) outputting the modified target document. In other words, the metadata tag associated with the preexisting document corresponding to the identified preexisting artifact vector is added or mapped to the target document. The basis for so copying the metadata tag to the target document is that the two documents were determined to be sufficiently similar at Step 214, as described above.

Adding the corresponding metadata tag may be performed by associating the metadata tag with the target document or the target artifact vector. For example, the metadata tag may be added to the data structure that defines the target document or the target artifact vector. In another example, the metadata tag may be stored separately in another file or data structure, and associated with or mapped to the target document or the target artifact vector. In either case, adding the corresponding metadata tag (either by directly modifying the target document file to contain the metadata tag or by otherwise associating the metadata tag with the target document) generates the modified target document.

Outputting the modified target document may be performed by storing the modified target document, possibly together with a separately stored associated metadata tag. Alternatively, outputting the modified target document may include transmitting the modified target document to another automated process seeking to use the modified target document as input.

The method of FIG. 2 is computationally efficient. For example, instead of using a large language model to generate a corresponding metadata tag for every document in a knowledge base that is to be updated, the metadata tags for preexisting documents that are sufficiently similar to the target documents(s) are mapped to the revised, new, or unrevised target documents. The computational resources used by mapping or copying a metadata tag are much less than the computational resources used by executing a machine learning model on a target document to generate a metadata tag. Thus, for industrial scale enterprise systems, a metadata tag generation process that would be impractical or impossible using large language models becomes possible for the enterprise system to generate. In this manner, one or more embodiments improve a computer's ability to perform the desired computer-centric functions, and accordingly improve the computer as a tool for performing the desired metadata tag generation process.

While the various steps in this flowchart are presented and described sequentially, at least some of the steps may be executed in different orders, may be combined, or omitted, and at least some of the steps may be executed in parallel. Furthermore, the steps may be performed actively or passively.

FIG. 3A-FIG. 3D show an example of computationally efficient artifact tagging of a target document, in accordance with one or more embodiments. The following example is for explanatory purposes only and not intended to limit the scope of one or more embodiments.

Figure 3A:
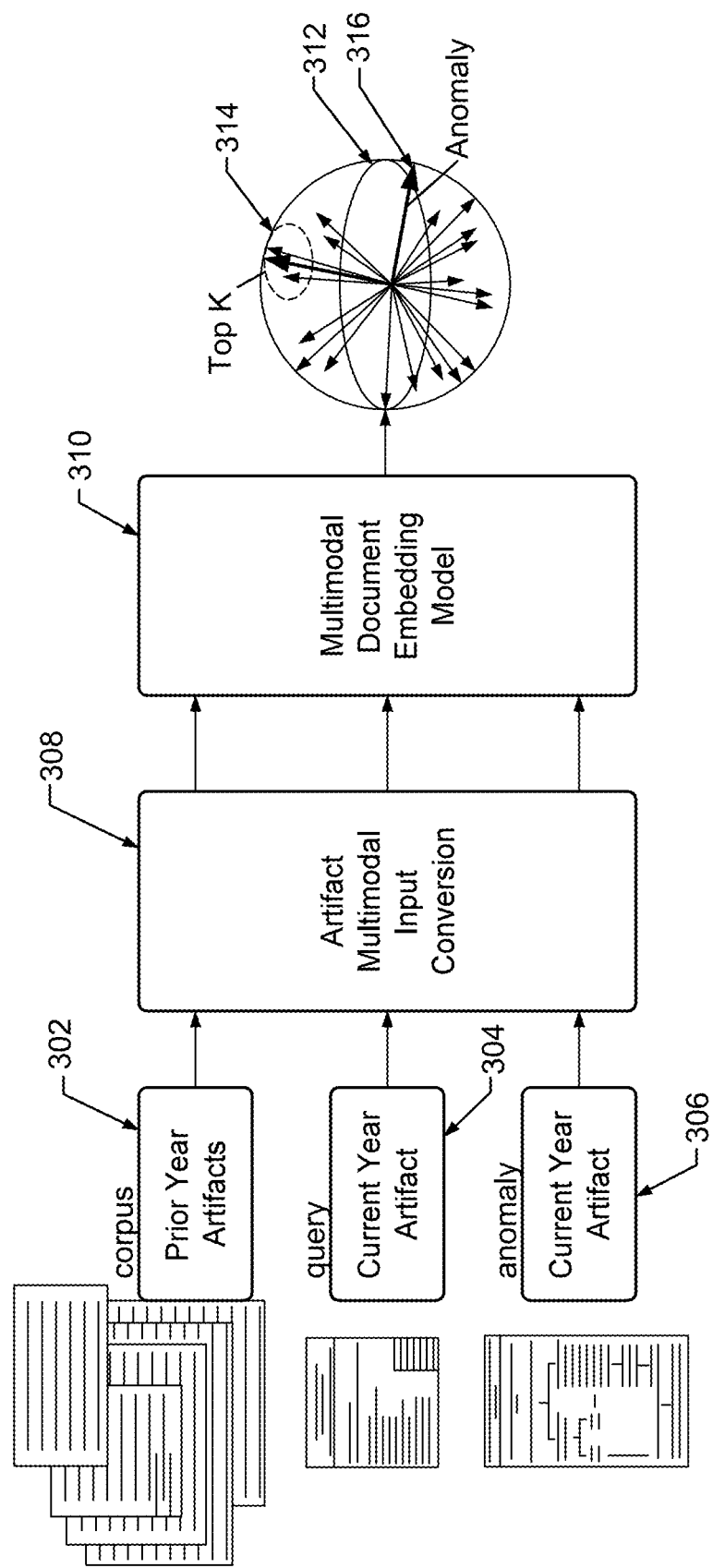
FIG. 3A, FIG. 3B, FIG. 3C, FIG. 3D, and FIG. 4 show an example of computationally efficient artifact tagging in accordance with one or more embodiments.

FIG. 3A shows a visualization of the method described above with respect to FIG. 2. A target artifact representing a target document is to be revised or added to a knowledge base. The corpus of the database includes various prior year artifacts (302) representing information in the knowledge base.

The target artifact is received by the system. As shown, the target artifact may be a query current year artifact (304), or an anomaly current year artifact (306). The system applies an artifact multimodal input conversion (308) to the artifacts to generate, for each artifact, an image collage and sequential spatial-formatted text extraction. A multimodal document embedding model (310) is applied to the image collage and sequential spatial-formatted text extraction for the artifact to generate an associated target vector.

As shown, in the embedding space visualization (312), the query embedding space vector (314), which is based on the query current year artifact (304), is found to be located near (in the embedding space) vectors representing the prior year artifacts. In other words, the query embedding space vector (314) for the current year artifact (304) satisfies a predetermined similarity threshold value. The metadata tags associated with the preexisting prior year documents that corresponds to the nearest neighbors of the query embedding space vector (314) in the embedding space visualization (312) then may be associated with the query current year artifact (304) (i.e., the target document).

The anomaly embedding space vector (316), in contrast, is not located near (in the embedding space) vectors representing the preexisting prior year artifacts. Accordingly, the anomaly current year artifact (306) is determined to be anomalous. Accordingly, none of the metadata tags associated with the prior year artifacts (302) are associated with the target document (i.e., the current year artifact (306), in this case). The anomalous document (either the current year artifact (306) or the anomaly (316) then may be provided to a large language model for generation of a corresponding metadata tag, or provided to a human user for generation of the corresponding metadata tag.

Figure 3B:
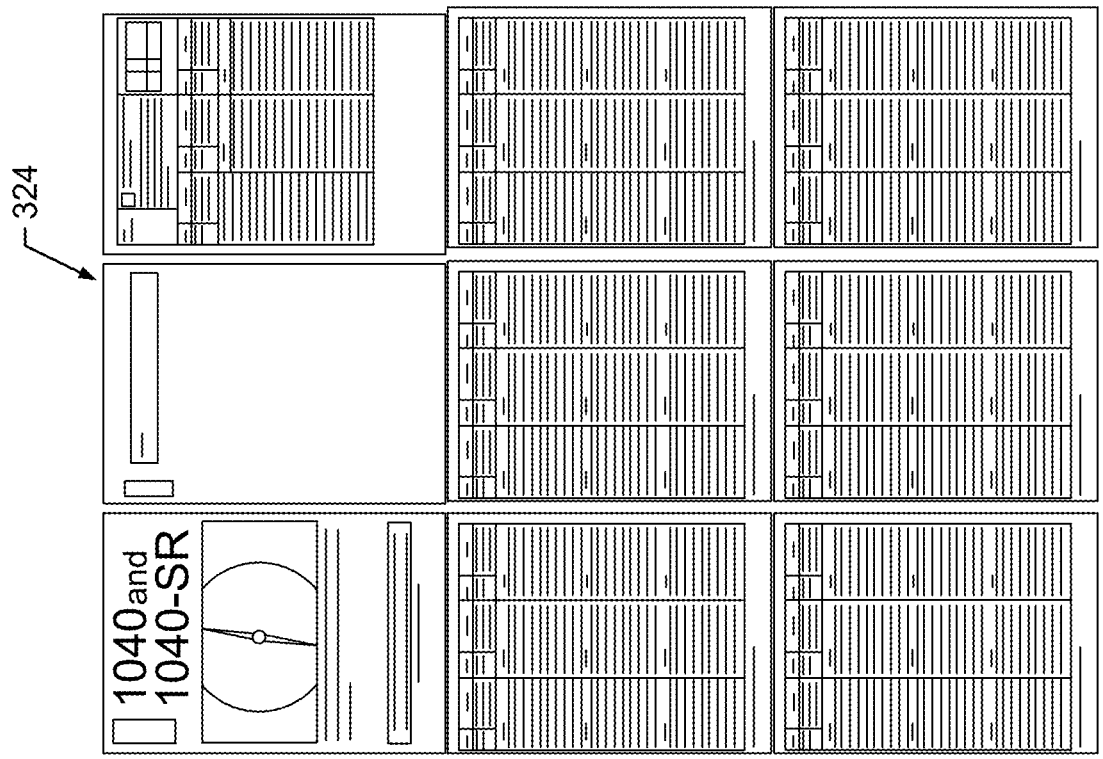
Figure 3B:
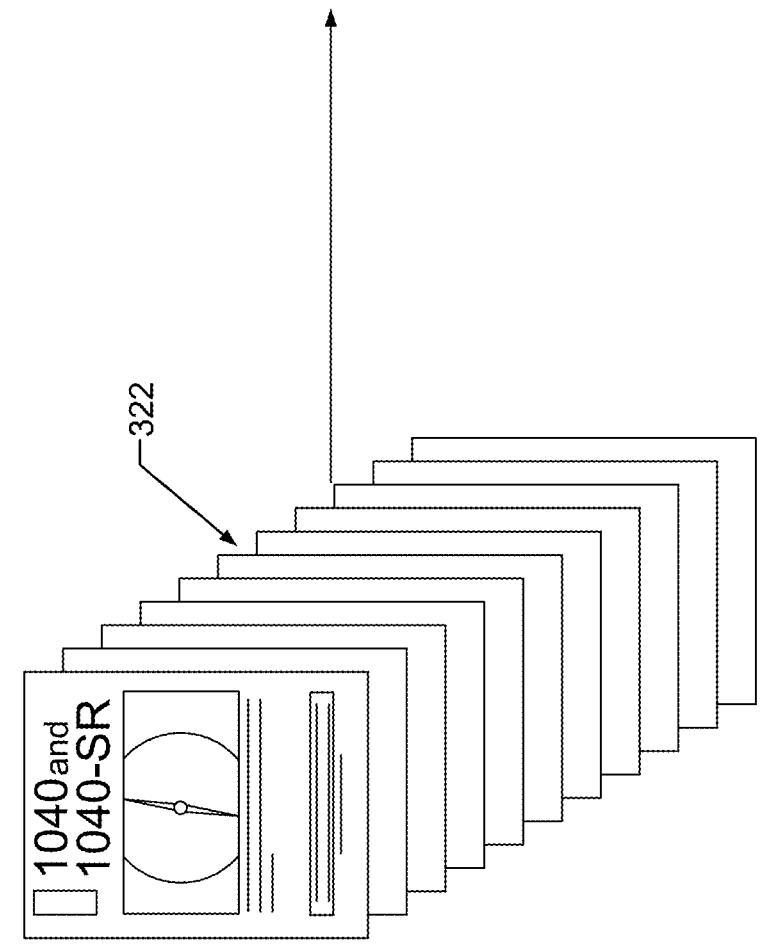

FIG. 3B shows the processing of a target artifact (322) to generate an associated artifact image collage, for example, by artifact multimodal input conversion (308). The target artifact (322) is a document having multiple pages. The pages are arranged in a grid (324). The grid (324) is in sequence from left-to-right, top-to-bottom.

For example, the first page of the target artifact (322) is placed in the top-left corner and the second page is placed to the right of the first page. The grid may include each page of the target artifact (322), or in some embodiments, a subset of the pages of the target artifact (322), such as, the first ten pages, the first six odd numbered paged, etc. In the example shown, the instructions for filling out a tax form 1040 or a tax form 1040—SR are arranged, page-by-page, in the image collage represented by the grid (324).

Figure 3C:
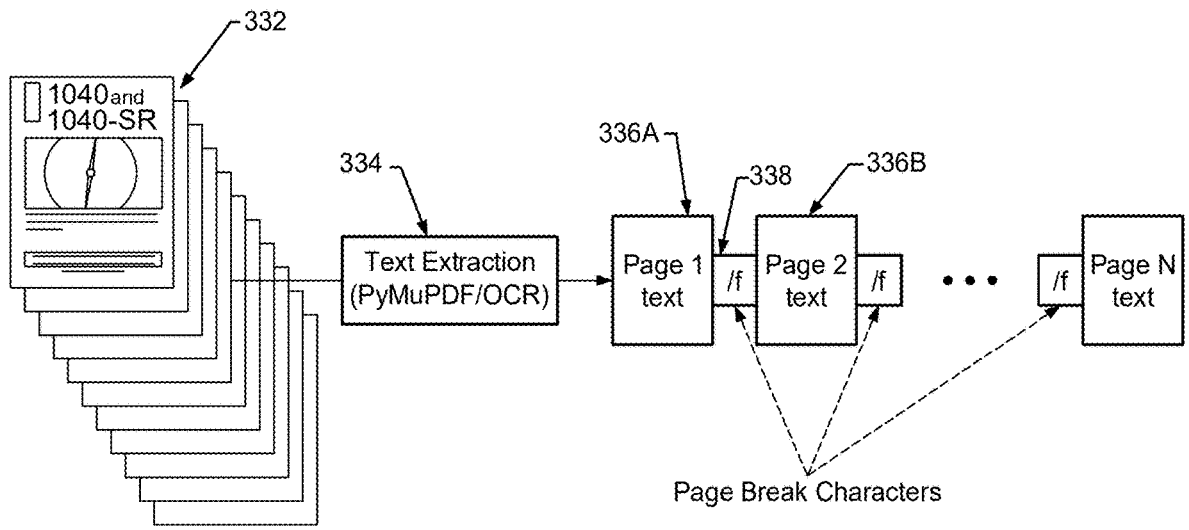

FIG. 3C shows the processing of a target artifact (332) to generate a sequential spatial-formatted text extraction, for example, by artifact multimodal input conversion (308). The system applies a text extraction application (334) to the target artifact (332) to identify two-dimensional text from each page (or each page in a subset of pages). The two-dimensional texts from the pages are concatenated together with a page break character separating the two-dimensional texts from adjacent pages, for example, the two-dimensional text from the first page (336A) is separated from the two-dimensional text from the second page (336B) by page break characters (338).

Figure 3D:
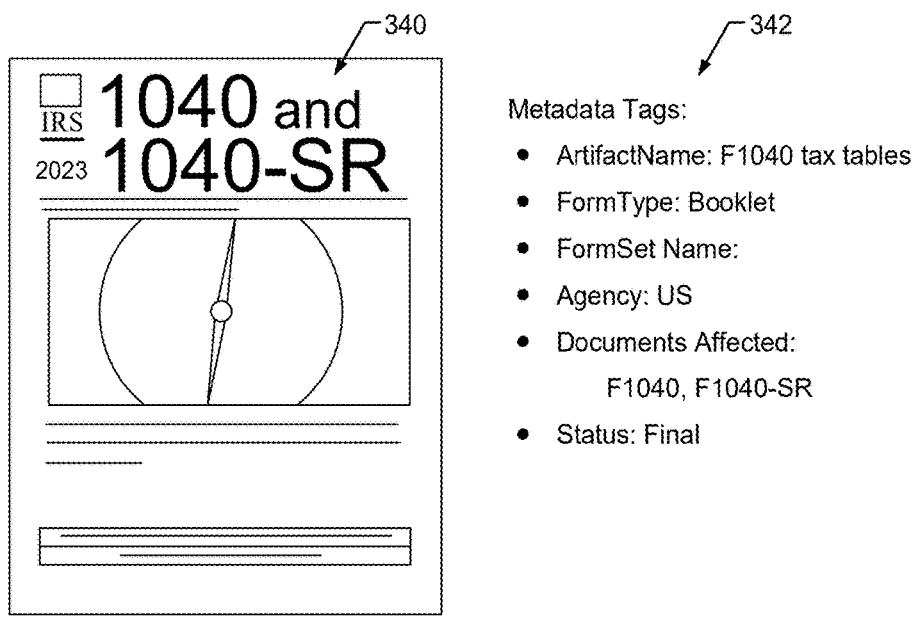

FIG. 3D illustrates a modified target artifact (340) generated from a target artifact, such as target artifact (322). The modified target artifact (340) includes the target artifact (322) and metadata tags (342). As described above, the metadata tags (342) include metadata tags associated with a prior year artifact found to have a similar embedded representation to the target artifact (340) in the embedding space. The modified target artifact (340) may be added to the corpus of the database as a new artifact or used to replace the similar prior year artifact.

The process of generating modified target artifact (340) is computationally efficient. As indicated above, generating the metadata tag (342) by copying or mapping uses far fewer computational resources than generating the metadata tag (342) using a machine learning model such as a large language model (LLM). Thus, FIG. 3A through FIG. 3D illustrate, by way of example, the technical solution to the technical problem of generating metadata tags when insufficient computational resources are available to generate such metadata tags by way of a machine learning model.

Figure 4:
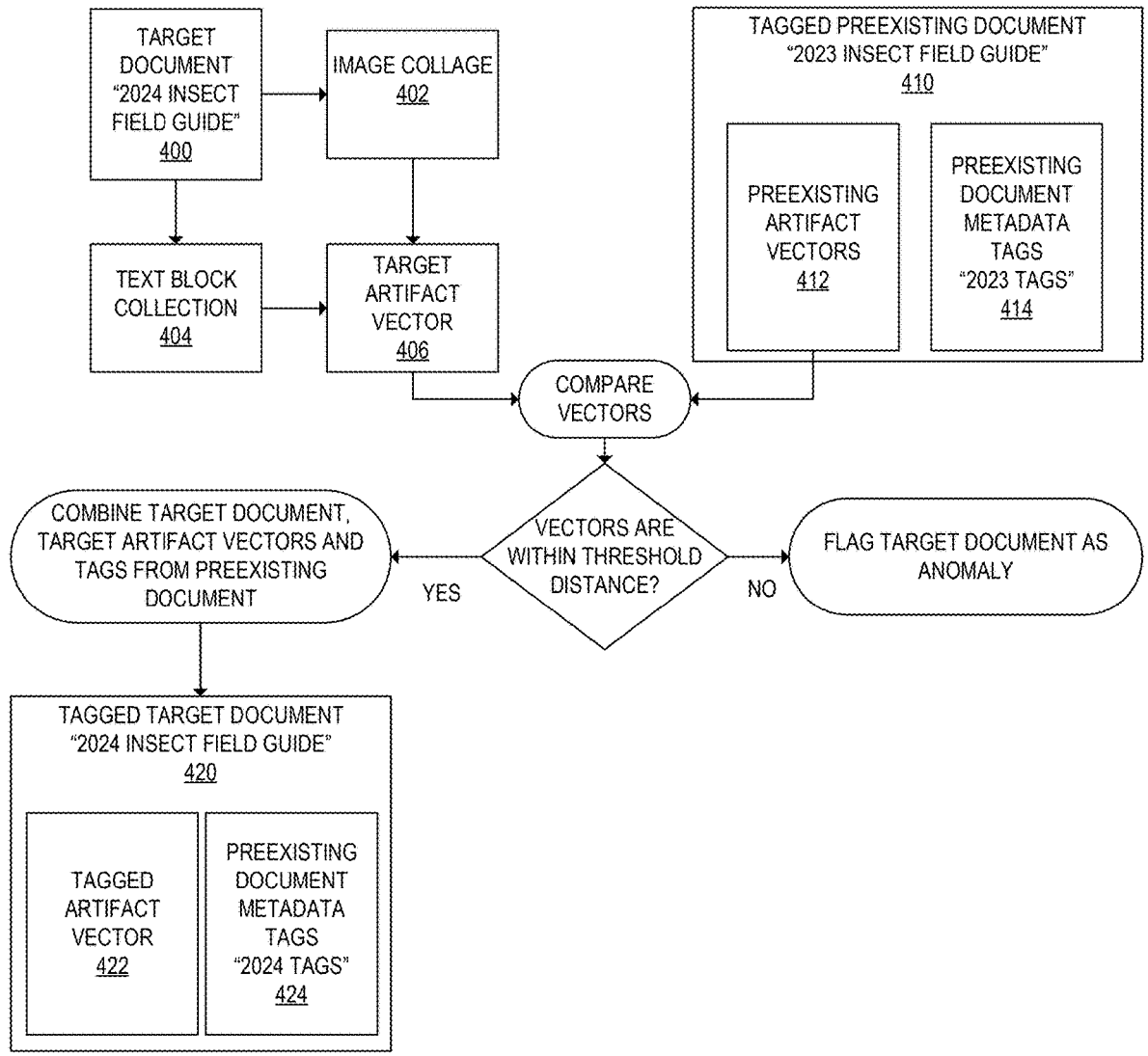

FIG. 4 shows another example of computationally efficient artifact tagging of a target document, in accordance with one or more embodiments. The following example is for explanatory purposes only and not intended to limit the scope of one or more embodiments.

A target document (400), titled "2024 Insect Field Guide," is received by a knowledge base system. The image pages of the target document (400) are used to generate an image collage (402) as described above. The image pages are also processed to develop a text block collection (404), such as by OCR. The system applies a multimodal embedding model to the image collage (402) and the text block collection (404) to generate a target artifact vector (406).

The knowledge base includes a tagged preexisting document (410), titled "2024 Insect Field Guide." The tagged preexisting document (410) is associated with preexisting artifact vectors (412). The tagged preexisting document (410) also includes preexisting document metadata tags (414), labeled "2024 Tags."

The system compares artifact vectors in the knowledge base to the target artifact vector (406). The comparison determines a distance, in the embedding space, between the artifact vectors in the knowledge base to the target artifact vector (406).

If the vectors are not within a threshold distance, the system flags the target document (400) as an anomaly. The system may then add the target document (400) to a set of documents for human review and/or may apply a large language model to generate synthetic tags.

On the other hand, if the vectors are within the threshold similarity distance, then the vector having the highest similarity distance value that satisfies the threshold similarity distance value is selected as corresponding artifact vector. The system creates a tagged target document (420) based on the target document (400), the target artifact vector (406) and the preexisting document metadata tags (414) associated with the corresponding artifact vector in the tagged preexisting document "2023 insect field guide" (410). The target document (400) is combined with the preexisting document metadata tags (414) to generate preexisting document metadata tags (424), which are relabeled "2024 Tags." The target artifact vector (406) is added as a tagged artifact vector (422). The tagged target document (420) is added to the knowledge base corpus.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 5A:
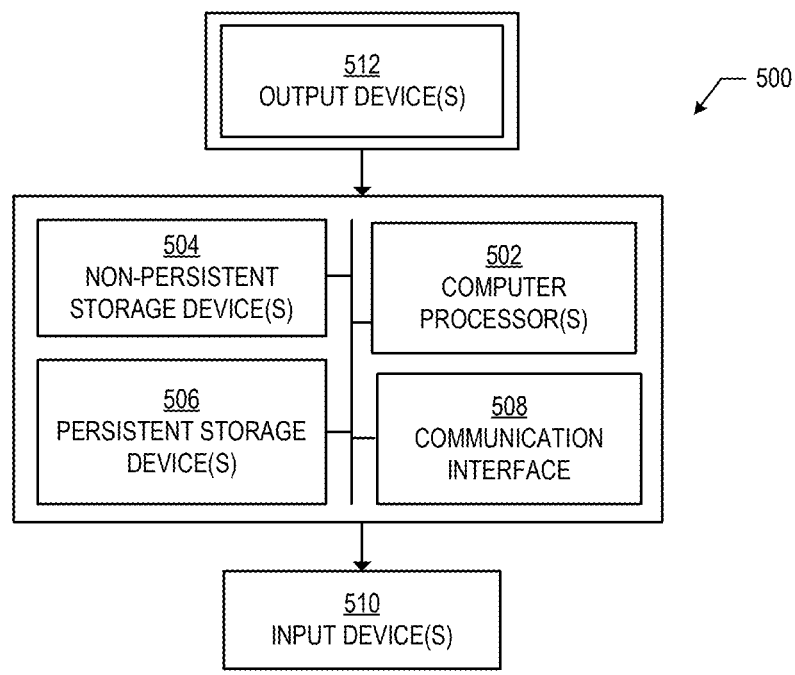
FIG. 5A and FIG. 5B show an example of a computing system and network environment in accordance with one or more embodiments.

For example, as shown in FIG. 5A, the computing system (500) may include one or more computer processor(s) (502), non-persistent storage device(s) (504), persistent storage device(s) (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) (502) may be one or more cores, or micro-cores, of a processor. The computer processor(s) (502) includes one or more processors. The computer processor(s) (502) may include a central processing unit (CPU), a graphics processing unit (GPU), a tensor processing unit (TPU), combinations thereof, etc.

The input device(s) (510) may include a touchscreen, keyboard, mouse, microphone, touchpad, electronic pen, or any other type of input device. The input device(s) (510) may receive inputs from a user that are responsive to data and messages presented by the output device(s) (512). The inputs may include text input, audio input, video input, etc., which may be processed and transmitted by the computing system (500) in accordance with one or more embodiments. The communication interface (508) may include an integrated circuit for connecting the computing system (500) to a network (not shown) (e.g., a local area network (LAN), a wide area network (WAN) such as the Internet, mobile network, or any other type of network) or to another device, such as another computing device, and combinations thereof.

Further, the output device(s) (512) may include a display device, a printer, external storage, or any other output device. One or more of the output device(s) (512) may be the same or different from the input device(s) (510). The input device(s) (510) and output device(s) (512) may be locally or remotely connected to the computer processor(s) (502). Many different types of computing systems exist, and the aforementioned input device(s) (510) and output device(s) (512) may take other forms. The output device(s) (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (502), is configured to perform one or more embodiments, which may include transmitting, receiving, presenting, and displaying data and messages described in the other figures of the disclosure.

Figure 5B:
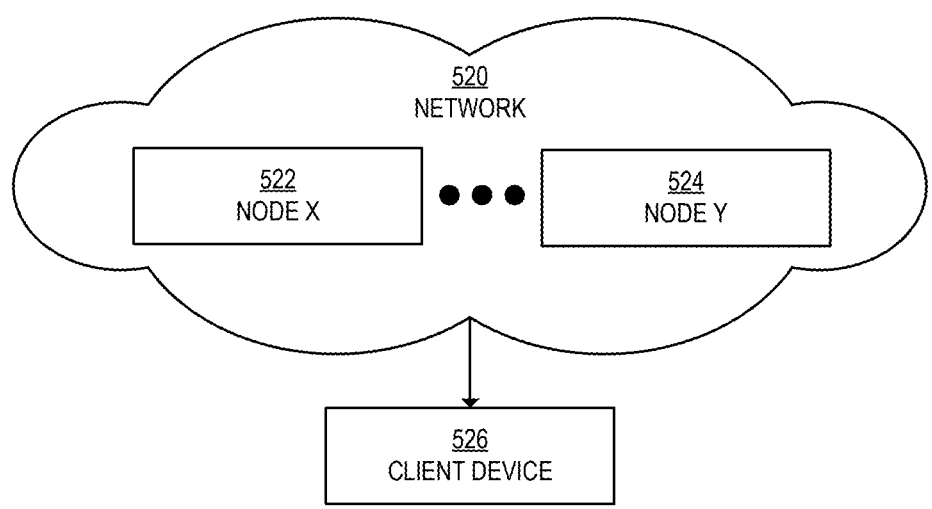

The computing system (500) in FIG. 5A may be connected to, or be a part of, a network. For example, as shown in FIG. 5B, the network (520) may include multiple nodes (e.g., node X (522) and node Y (524), as well as extant intervening nodes between node X (522) and node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522) and node Y (524)) in the network (520) may be configured to provide services for a client device (526). The services may include receiving requests and transmitting responses to the client device (526). For example, the nodes may be part of a cloud computing system. The client device (526) may be a computing system, such as the computing system shown in FIG. 5A. Further, the client device (526) may include or perform all or a portion of one or more embodiments.

The computing system of FIG. 5A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
    generating a plurality of image pages from a target document;
    generating an image collage by assembling the plurality of image pages into a sequential image mosaic comprising a plurality of pixels;
    extracting two-dimensional text and corresponding bounding boxes from the plurality of image pages;
    applying a structure verbalizer to spatially format the two-dimensional text in one-dimension with spatial information based on the corresponding bounding boxes to generate spatial-formatted text;
    concatenating the spatial-formatted text to generate a sequential spatial-formatted text extraction;
    applying a multimodal embedding model to the plurality of pixels of the image collage and the sequential spatial-formatted text extraction to generate a target artifact vector comprising an embedded representation of the plurality of pixels and the sequential spatial-formatted text extraction;

comparing, using a nearest-neighbor model, the target artifact vector against each preexisting artifact vector in a set of preexisting artifact vectors to identify a corresponding artifact vector from the set of preexisting artifact vectors, wherein the corresponding artifact vector is associated with a corresponding document, the corresponding document having a corresponding metadata tag; and determining that a multimodal embedding distance between the corresponding artifact vector and the target artifact vector are within a threshold distance and, in response to determining, performing:

applying the corresponding metadata tag to the target document to generate a modified target document, and outputting the modified target document.

2. The method of claim 1, wherein:
concatenating the spatial-formatted text to generate the sequential spatial-formatted text extraction comprises concatenating the spatial-formatted text from a first page,
the spatial-formatted text is from a subsequent page, and
a page break character separates the spatial-formatted text from the first page and separates the spatial-formatted text from the subsequent page.

3. The method of claim 1, wherein the corresponding artifact vector has a similar embedded representation that is similar to the embedded representation of the plurality of pixels and the sequential spatial-formatted text extraction.

4. The method of claim 1, further comprising:
confirming whether the corresponding metadata tag matches a portion of the two-dimensional text.

5. The method of claim 4, further comprising:
indicating, in response to the corresponding metadata tag not matching the portion of the two-dimensional text, that the corresponding metadata tag comprises a hallucination of a language model.

6. The method of claim 1, wherein the corresponding artifact vector is a preexisting artifact vector that is closest in a multimodal embedding space to the target artifact vector based on Euclidean distance.

7. The method of claim 1, wherein the corresponding artifact vector is a preexisting artifact vector that is closest in a multimodal embedding space to the target artifact vector based on nearest neighbor voting.

8. The method of claim 1, further comprising:
flagging, in response to the multimodal embedding distance between the corresponding artifact vector and the target artifact vector not being within the threshold distance, the target document as an anomalous document.

9. The method of claim 8, further comprising taking additional steps in response to flagging the target document as the anomalous document, the additional steps comprising:
applying a large language model to the target document to generate a created metadata tag;
adding the created metadata tag to the target document to generate the modified target document; and
outputting the modified target document.

10. The method of claim 1, further comprising:
applying optical character recognition to the plurality of image pages to extract the two-dimensional text.

11. The method of claim 1, wherein the image collage comprises a grid of the plurality of image pages, the grid in sequence from left-to-right, top-to-bottom.

12. A system comprising:
a server comprising a processor;
a data repository in communication with the processor, and storing:
a target document, the target document comprising two-dimensional text, an image collage comprising a sequential image mosaic having a plurality of pixels,
spatial-formatted text comprising the two-dimensional text spatially formatted in one-dimension,
a sequential spatial-formatted text extraction,
a target artifact vector comprising an embedded representation of the plurality of pixels and the sequential spatial-formatted text extraction,
a set of preexisting artifact vectors, wherein each of set of preexisting artifact vectors has an embedded representation, and is associated with a corresponding document,
a threshold distance, and
a modified target document;
a structure verbalizer which, when executed by the processor, is programmed to apply the structure verbalizer to spatially format the two-dimensional text in one-dimension with spatial information based on corresponding bounding boxes from a plurality of image pages to generate the spatial-formatted text;
a multimodal embedding model which, when executed by the processor, is programmed to apply the multimodal embedding model to the plurality of pixels of the image collage and the sequential spatial-formatted text extraction to generate the target artifact vector; and
a server controller which, when executed by the processor, performs a computer-implemented method comprising:
generating the plurality of image pages from the target document,
generating the image collage by assembling the plurality of image pages into the sequential image mosaic,
extracting the two-dimensional text and corresponding bounding boxes from the image pages,
applying the structure verbalizer to the two-dimensional text to generate the spatial-formatted text,
concatenating the spatial-formatted text to generate the sequential spatial-formatted text extraction,
applying the multimodal embedding model to the plurality of pixels of the image collage and the sequential spatial-formatted text extraction to generate the target artifact vector,
comparing, using a nearest-neighbor model, the target artifact vector against each preexisting artifact vector in the set of preexisting artifact vectors to identify a corresponding artifact vector from the set of preexisting artifact vectors, wherein the corresponding artifact vector:
has a similar embedded representation that is similar to the embedded representation of the plurality of pixels and the sequential spatial-formatted text extraction, and
is associated with a corresponding document, the corresponding document having a corresponding metadata tag; and
determining that a multimodal embedding distance between the corresponding artifact vector and the target artifact vector is within the threshold distance and, in response to determining, performing additional steps comprising:

adding the corresponding metadata tag to the target document to generate the modified target document; and outputting the modified target document.

13. The system of claim 12, wherein the computer-implemented method further comprises:

concatenating the spatial-formatted text from a first page, the spatial-formatted text from a subsequent page and a page break character separating the spatial-formatted text from the first page and the spatial-formatted text from the subsequent page.

14. The system of claim 12, wherein the computer-implemented method further comprises:

confirming whether the corresponding metadata tag matches a portion of the two-dimensional text.

15. The system of claim 14, wherein the computer-implemented method further comprises:

indicating, in response to the corresponding metadata tag not matching the portion of the two-dimensional text, that the corresponding metadata tag comprises a hallucination of a language model.

16. The system of claim 12, wherein the computer-implemented method further comprises:

flagging, in response to the multimodal embedding distance between the corresponding artifact vector and the target artifact vector not being within the threshold distance, the target document as an anomalous document; and performing, in response to flagging the target document as the anomalous document, additional steps comprising:

applying a large language model to the target document to generate a created metadata tag;

adding the created metadata tag to the target document to generate the modified target document; and outputting the modified target document.

17. The system of claim 12, wherein the computer-implemented method further comprises:

applying optical character recognition to the plurality of image pages to extract the two-dimensional text.

18. The system of claim 12, wherein the image collage comprises a grid of the plurality of image pages.

19. The system of claim 18, wherein the grid is in sequence from left-to-right, top-to-bottom.

20. A method comprising:

generating a plurality of image pages from a target document;

generating an image collage by assembling the plurality of image pages into a sequential image mosaic comprising a plurality of pixels;

extracting two-dimensional text and corresponding bounding boxes from the plurality of image pages;

applying a structure verbalizer to spatially format the two-dimensional text in one-dimension with spatial information based on the corresponding bounding boxes to generate spatial-formatted text;

concatenating the spatial-formatted text to generate a sequential spatial-formatted text extraction;

applying a multimodal embedding model to the plurality of pixels of the image collage and the sequential spatial-formatted text extraction to generate a target artifact vector comprising an embedded representation of the plurality of pixels and the sequential spatial-formatted text extraction;

comparing using a nearest-neighbor model to the target artifact vector against each preexisting artifact vector in a set of preexisting artifact vectors to identify a corresponding artifact vector from the set of preexisting artifact vectors, wherein the corresponding artifact vector:

has a similar embedded representation that is similar to the embedded representation of the plurality of pixels and the sequential spatial-formatted text extraction, and is associated with a corresponding document, the corresponding document having a corresponding metadata tag; and performing, in response to a multimodal embedding distance between the corresponding artifact vector and the target artifact vector not being within a threshold distance, additional steps comprising:

flagging the target document as an anomalous document, applying a large language model to the target document to generate a created metadata tag, adding the created metadata tag to the target document to generate a modified target document, and outputting the modified target document.

* * * * *